United States Patent
Heo et al.

(10) Patent No.: US 8,553,356 B1
(45) Date of Patent: Oct. 8, 2013

(54) DISK LIMITER FOR DISK DRIVE

(75) Inventors: Baekho Heo, San Jose, CA (US); David K. Myers, Campbell, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/301,611

(22) Filed: Nov. 21, 2011

(51) Int. Cl.
*G11B 33/14* (2006.01)
*G11B 33/12* (2006.01)

(52) U.S. Cl.
USPC .................. 360/99.18; 360/97.12; 360/97.19; 360/97.2; 360/99.15

(58) Field of Classification Search
USPC ............. 360/99.15, 99.18, 97.12, 97.19, 97.2
See application file for complete search history.

(56) References Cited

U.S. PATENT DOCUMENTS

| | | |
|---|---|---|
| 4,939,611 A | 7/1990 | Connolly |
| 5,231,549 A | 7/1993 | Morehouse et al. |
| 5,239,431 A | 8/1993 | Day et al. |
| 5,453,889 A | 9/1995 | Alt |
| 5,541,791 A | 7/1996 | Yamasaki et al. |
| 5,625,514 A | 4/1997 | Kubo et al. |
| 5,640,290 A | 6/1997 | Khanna et al. |
| 5,757,587 A | 5/1998 | Berg et al. |
| 5,801,899 A | 9/1998 | Genheimer |
| 5,864,444 A | 1/1999 | Baker et al. |
| 5,903,409 A | 5/1999 | Allen et al. |
| 5,959,807 A | 9/1999 | Jurgenson |
| 6,055,134 A | 4/2000 | Boutaghou |
| 6,084,744 A | 7/2000 | Genheimer et al. |
| 6,115,214 A | 9/2000 | Allsup et al. |
| 6,137,658 A | 10/2000 | Matsuzaki et al. |
| 6,172,843 B1 | 1/2001 | Genheimer et al. |
| 6,208,484 B1 | 3/2001 | Voights |
| 6,215,628 B1 | 4/2001 | Boutaghou |
| 6,226,144 B1 | 5/2001 | Nagl et al. |
| 6,236,531 B1 | 5/2001 | Allsup et al. |
| 6,271,987 B1 | 8/2001 | Allsup et al. |
| 6,273,823 B1 | 8/2001 | Rohs et al. |
| 6,341,051 B2 | 1/2002 | Hachiya et al. |
| 6,351,344 B1 | 2/2002 | Krum et al. |
| 6,351,350 B1 | 2/2002 | Symons et al. |
| 6,377,420 B1 | 4/2002 | Tadepalli et al. |
| 6,407,879 B1 | 6/2002 | Fruge' et al. |
| 6,417,986 B1 | 7/2002 | Tran et al. |
| 6,424,487 B2 | 7/2002 | Nagl et al. |
| 6,452,753 B1 | 9/2002 | Hiller et al. |
| 6,473,270 B1 | 10/2002 | McDonald et al. |
| 6,477,000 B1 | 11/2002 | Pottebaum et al. |
| 6,542,328 B2 | 4/2003 | Harrison et al. |
| 6,556,383 B2 | 4/2003 | Murphy et al. |
| 6,624,966 B1 | 9/2003 | Ou-Yang et al. |

(Continued)

FOREIGN PATENT DOCUMENTS

| | | |
|---|---|---|
| EP | 1615224 B1 | 9/2009 |
| JP | 62088195 A * | 4/1987 |

(Continued)

*Primary Examiner* — Will J Klimowicz

(57) ABSTRACT

A disk drive including a disk having a top surface, a cover positioned over the disk, and a disk limiter protruding from the cover toward the disk. The disk limiter is configured to contact a portion of the top surface of the disk when the disk is deflected toward the cover, and has a middle portion between two end portions. At least one portion of the disk limiter curves or slopes in a direction away from the disk.

23 Claims, 7 Drawing Sheets

(56) References Cited

U.S. PATENT DOCUMENTS

| | | |
|---|---|---|
| 6,724,566 B2 | 4/2004 | Kant et al. |
| 6,765,762 B2 | 7/2004 | Yanagihara |
| 6,781,791 B1 | 8/2004 | Griffin et al. |
| 6,791,790 B2 | 9/2004 | Lee |
| 6,891,696 B1 | 5/2005 | Ou-Yang et al. |
| 6,894,867 B2 | 5/2005 | Hong et al. |
| 6,917,491 B2 | 7/2005 | Choi |
| 6,930,857 B1 | 8/2005 | Lin et al. |
| 6,961,207 B2 | 11/2005 | Kang et al. |
| 7,057,849 B2 | 6/2006 | Soderfelt et al. |
| 7,085,098 B1 | 8/2006 | Yang et al. |
| 7,136,246 B2 | 11/2006 | Khanna et al. |
| 7,146,713 B1 | 12/2006 | Ying |
| 7,256,959 B2 * | 8/2007 | Morioka .................... 360/99.18 |
| 7,274,537 B2 | 9/2007 | Fan et al. |
| 7,307,811 B2 | 12/2007 | Xu et al. |
| 7,310,199 B2 | 12/2007 | Pottebaum et al. |
| 7,327,530 B2 | 2/2008 | Lee et al. |
| 7,372,662 B2 | 5/2008 | Xu et al. |
| 7,420,775 B2 | 9/2008 | Lim |
| 7,428,741 B2 | 9/2008 | Kim et al. |
| 7,457,078 B2 | 11/2008 | Fukaya et al. |
| 7,474,500 B2 * | 1/2009 | Kim .......................... 360/97.13 |
| 7,529,062 B2 * | 5/2009 | Xu ............................ 360/97.19 |
| 7,530,082 B2 * | 5/2009 | Chang ......................... 720/648 |
| 7,570,453 B2 | 8/2009 | Kim et al. |
| 7,602,586 B2 | 10/2009 | Kim et al. |
| 7,751,145 B1 | 7/2010 | Lin et al. |
| 7,839,602 B2 | 11/2010 | Dunckley et al. |
| 7,961,426 B2 | 6/2011 | Naruse |
| 8,009,384 B1 | 8/2011 | Little |
| 8,089,733 B2 * | 1/2012 | Ng et al. ..................... 360/245.7 |
| 8,164,848 B2 | 4/2012 | Chan et al. |
| 8,194,346 B2 * | 6/2012 | Kubo ......................... 360/97.19 |
| 8,228,631 B1 | 7/2012 | Tsay et al. |
| 8,289,646 B1 | 10/2012 | Heo et al. |
| 8,446,688 B1 * | 5/2013 | Quines et al. .............. 360/97.14 |
| 2001/0012174 A1 | 8/2001 | Imamura |
| 2003/0151848 A1 * | 8/2003 | Lee ............................ 360/97.02 |
| 2004/0085676 A1 * | 5/2004 | Aoishi et al. ................... 360/133 |
| 2005/0057854 A1 | 3/2005 | Khanna et al. |
| 2005/0190488 A1 | 9/2005 | Chan et al. |
| 2006/0005214 A1 | 1/2006 | Kim et al. |
| 2006/0176608 A1 | 8/2006 | Xu et al. |
| 2007/0081269 A1 | 4/2007 | Kim et al. |
| 2010/0177442 A1 * | 7/2010 | Ng et al. ..................... 360/245.3 |
| 2011/0255190 A1 | 10/2011 | Lee et al. |
| 2011/0286131 A1 | 11/2011 | Teo et al. |

FOREIGN PATENT DOCUMENTS

| | | | |
|---|---|---|---|
| JP | 06236670 A | * | 8/1994 |
| JP | 08297817 A | * | 11/1996 |
| JP | 2000149493 A | * | 5/2000 |
| JP | 2000268485 A | * | 9/2000 |
| JP | 2003249053 A | * | 9/2003 |
| JP | 2003331562 A | * | 11/2003 |
| WO | WO 2004081942 A1 | * | 9/2004 |
| WO | WO 2007115453 A1 | * | 10/2007 |

* cited by examiner

DISK LIMITER FOR DISK DRIVE

BACKGROUND

Disk drives are often used in electronic devices to record data onto or to reproduce data from a recording media, which can include one or more disks having recording surfaces. If the disk drive is subjected to a non-operational mechanical shock, such as when an electronic device is dropped, a disk inside the disk drive can deflect. Such disk deflection may be limited by contact between the disk and other components of the disk drive, such as the disk drive cover, ramp or base. Such contact may cause damage to the disk and result in a loss of data recorded on the disk.

Electronic device manufacturer's specifications for mechanical shock robustness for disk drives are becoming more stringent, especially for disk drives used in mobile electronic devices. To meet such stringent specifications, a disk drive needs to survive more severe mechanical shocks without losing data recorded on a disk. More severe mechanical shocks may cause impact between a disk and a cover of the disk drive, despite a nominal clearance between the two. Moreover, the nominal clearance may not be practically increased to the extent necessary to prevent such impacts because of dimensional constraints of the disk drive or operational considerations.

BRIEF DESCRIPTION OF THE DRAWINGS

The features and advantages of the present embodiments will become more apparent from the detailed description set forth below when taken in conjunction with the drawings. The drawings and the associated descriptions are provided to illustrate embodiments of the disclosure and not to limit the scope of the disclosure. Reference numbers are reused throughout the drawings to indicate correspondence between referenced elements.

DETAILED DESCRIPTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
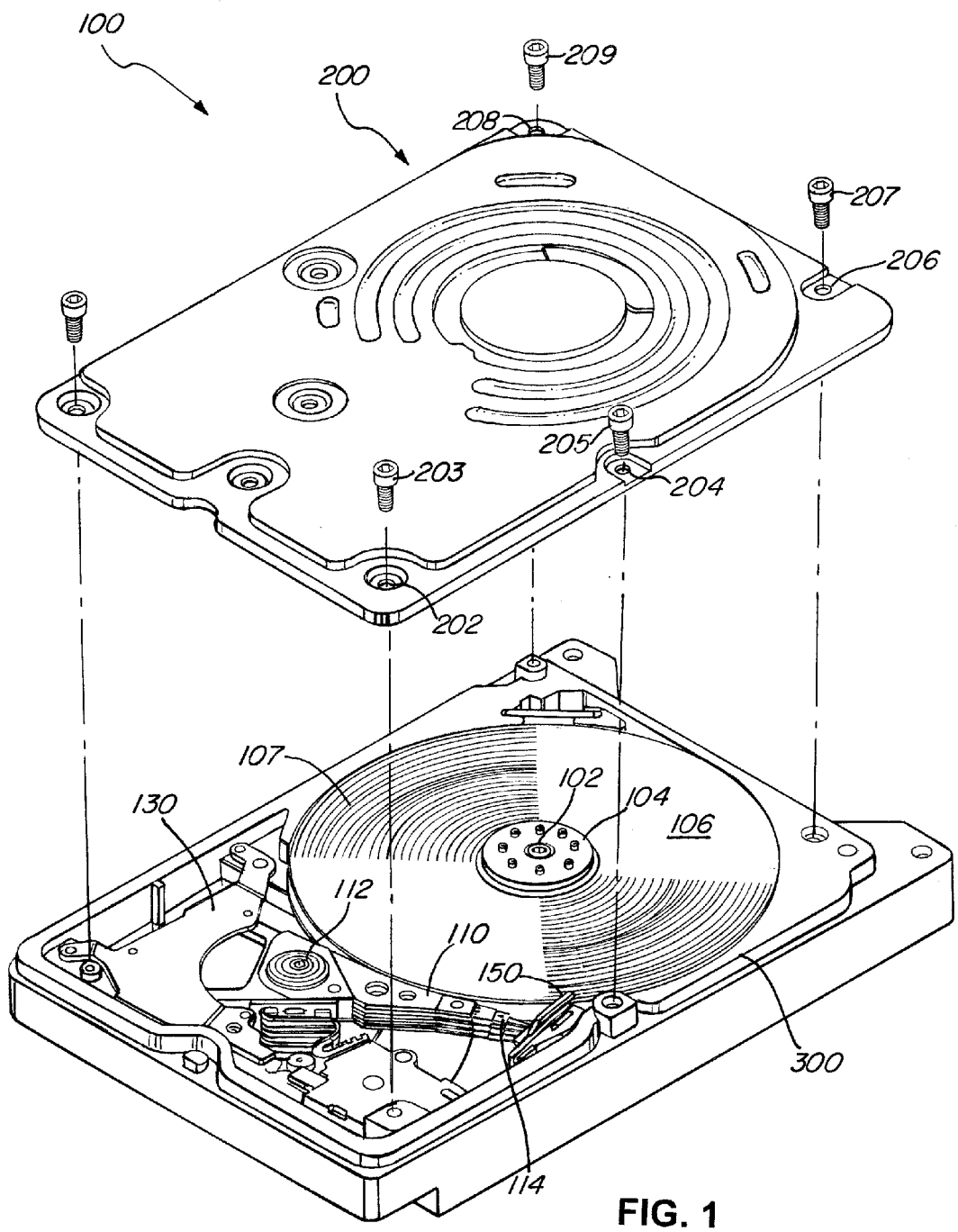
FIG. 1 depicts a perspective view of a disk drive according to an embodiment of the present invention.

FIG. 1 shows an exploded perspective view of disk drive 100 according to an embodiment of the present invention. Disk drive 100 includes base 300 and spindle 104 affixed to base 300. Spindle 104 defines axis 102 (normal to the page in FIG. 1) about which disk 106 rotates.

Disk 106 is mounted on spindle 104 and includes top surface 107 upon which data can be recorded. In contemporary magnetic hard disk drive applications, disk 106 may comprise an aluminum, glass, or ceramic substrate, with the substrate being coated with a NiP under-layer, a thin-film magnetic layer, a diamond-like amorphous carbon protective layer, and a very thin lubricant layer.

In certain embodiments, disk drive 100 of FIG. 1 may include a plurality of disks that are mounted on spindle 104. For example, disk 106 may be a top disk below which one or more additional disks may be mounted on the spindle 104.

Actuator 110 is affixed to base 300 and is typically fabricated from aluminum, magnesium, beryllium, or stainless steel. Actuator 110 pivots about pivot bearing ring 112 that is inserted as a cartridge into a bore in the actuator. Pivot bearing ring 112 is typically retained in the bore by a C-clip or tolerance ring but may be otherwise retained (e.g., by an adhesive). Actuator 110 is rotated about pivot bearing ring 112 by voice coil motor 130.

In the embodiment of FIG. 1, head gimbal assembly (HGA) 114 is attached to actuator 110 and may support read and write heads near its distal end. HGA 114 may also include a lift-tab at its distal end which is in contact with a parking surface of ramp 150 when disk drive 100 is in a non-operational state. Ramp 150 is affixed to base 300 and extends over a portion of top surface 107 of disk 106. In alternative embodiments, ramp 150 may be formed as part of base 300.

At the beginning of a period of non-operation of disk drive 100, actuator 110 swings HGA 114 away from spindle 104 and beyond an outer peripheral extent of disk 106. The lift-tab of HGA 114 then contacts ramp 150 to separate or "unload" the read head from top surface 107 of disk 106. After such unloading, ramp 150 and its parking surface support the distal end of HGA 114, rather than disk 106 providing such support.

Ramp 150 may be fabricated from any suitable material having acceptable cost, dimensional stability, and tribological characteristics, although a material that can be injection molded is preferred. For example, ramp 150 may comprise polyoxymethylene (POM), polycarbonate, a liquid crystal polymer (LCP), nylon, an acetal resin plastic or acetyl homopolymer, and/or polyetherimide, among other materials.

As shown in the exploded view of FIG. 1, base 300 is secured to cover 200 using fasteners, such as screws 203, 205, 207 and 209, inserted through holes, such as holes 202, 204, 206 and 208. In alternative embodiments, cover 200 may be attached to base 300 using non-removable fasteners, such as rivets or an adhesive. When affixed to base 300, cover 200 is positioned over disk 106. Cover 200 may be made of a plastic material or a metal, such as stainless steel, aluminum or titanium.

Figure 2:
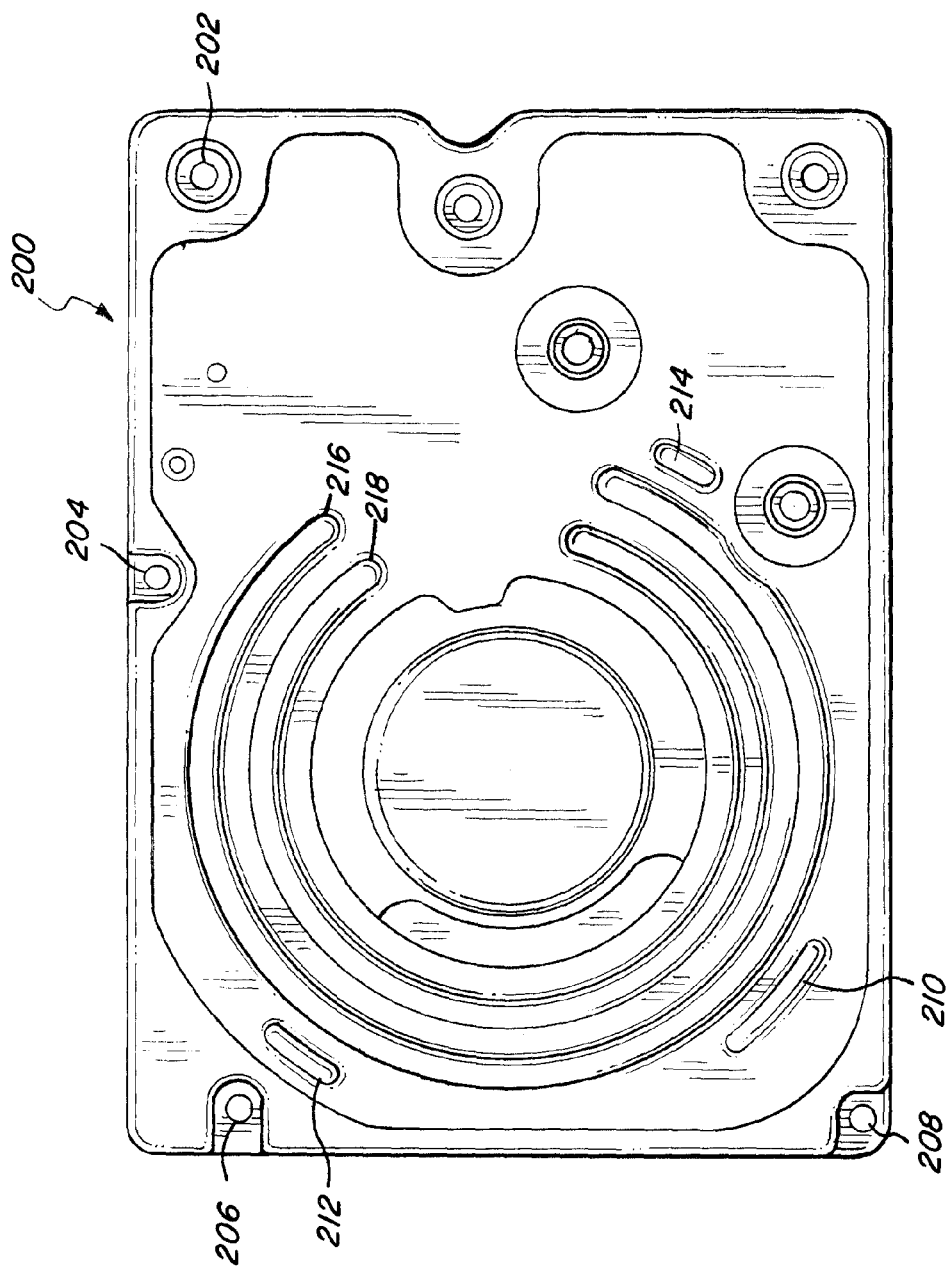
FIG. 2 depicts a bottom view of a disk drive cover according to an embodiment of the present invention.

FIG. 2 depicts a bottom view of cover 200. As shown in FIG. 2, the bottom surface of cover 200 includes stiffening ribs 216 and 218 to add structural support to cover 200. The bottom surface of cover 200 also includes disk limiters, such as disk limiters 210, 212 and 214, which protrude from cover 200 toward top surface 107 of disk 106 (shown in FIG. 1). Disk limiters 210, 212 and 214 protrude farther from cover 200 than stiffening ribs 216 and 218, and are positioned on the bottom surface of cover 200 to contact a portion of top surface 107 when disk 106 is deflected toward cover 200. Such upward deflection of disk 106 may occur during non-operational mechanical shock.

In this embodiment, disk limiters 210, 212 and 214 are radially positioned and contoured about a center approximately corresponding to axis 102 shown in FIG. 1. Disk limiters 210, 212 and 214 are located at approximately the same radius from axis 102 and are configured to contact an outer diameter portion of top surface 107, preferably in a location where data is not written.

The foregoing positions, quantities and contours of disk limiters are merely an example arrangement. As can be appreciated by those of ordinary skill in the art, many other arrangements of disk limiters are possible without departing from the spirit or scope of the present invention.

In the example embodiment of FIG. 2, disk limiters 210, 212 and 214 are formed in cover 200 by a metal stamping process. Alternatively, disk limiters 210, 212 and 214 may be molded as part of cover 200. In other embodiments, disk limiters 210, 212 and 214 may be formed of an elastomeric material, a form in place gasket, or a rubber material bonded to the bottom surface of cover 200.

Figure 3A:
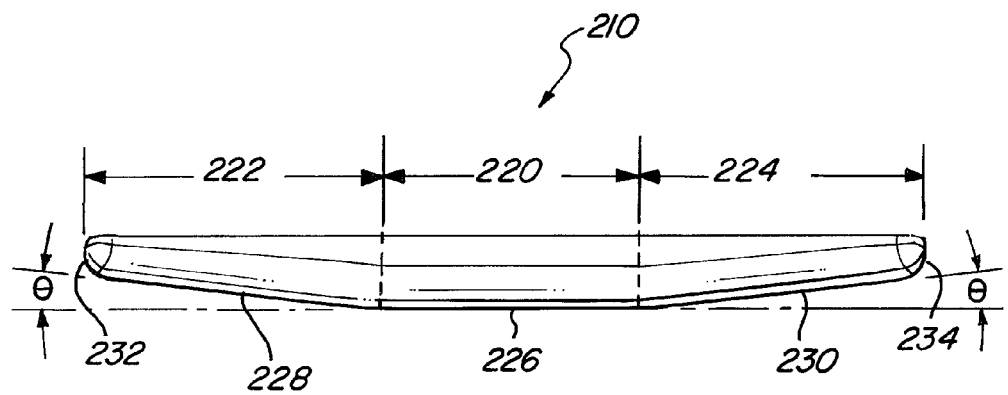
FIG. 3A depicts a three-dimensional view of a disk limiter according to a first embodiment.
Figure 3B:
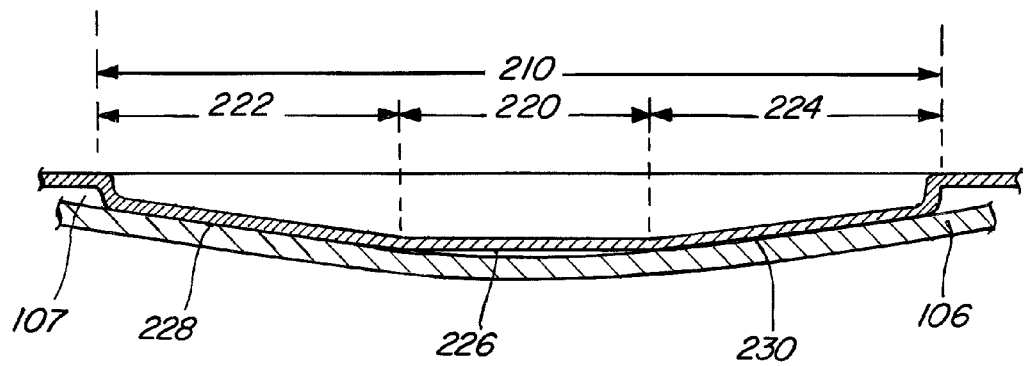
FIG. 3B depicts a lengthwise cross-sectional view of a disk limiter according to the first embodiment.
Figure 3C:
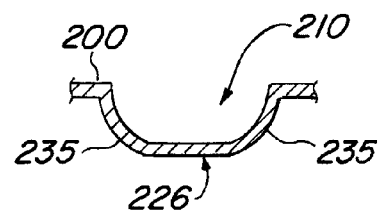
FIG. 3C depicts a widthwise cross-sectional view of a disk limiter according to the first embodiment.

FIGS. 3A to 3C depict a first embodiment of a disk limiter which is positioned on cover 200. FIG. 3A depicts a three-dimensional view of disk limiter 210, FIG. 3B depicts a lengthwise cross-sectional view of disk limiter 210, and FIG. 3C depicts a widthwise cross-sectional view of disk limiter 210. As shown in FIGS. 3A and 3B, disk limiter 210 includes middle portion 220 and end portions 222 and 224. Although middle portion 220 is shown in the embodiment of FIGS. 3A to 3C as being located approximately in the center of disk limiter 210, it will be appreciated by those or ordinary skill in the art that middle portion 220 can be offset from the center of disk limiter 210 without departing from the spirit and scope of the present invention.

Middle portion 220 has a relatively flat bottom surface 226 with respect to a widthwise cross-section of disk limiter 210, as shown in FIG. 3C. In addition, bottom surface 226 is substantially parallel to top surface 107 of disk 106. End portions 222 and 224 each have, respectively, relatively flat bottom surfaces 228 and 230 with respect to a widthwise cross-section of disk limiter 210. Disk limiter 210 also includes rounded ends 232 and 234 on end portions 222 and 224, respectively.

As shown in FIG. 3A, bottom surfaces 228 and 230 each form a chamfer sloping from middle portion 220 in a direction away from disk 106. Bottom surfaces 228 and 230 each define a chamfer angle θ with a plane substantially parallel to bottom surface 226 of middle portion 220. Chamfer angle θ can vary upon several factors, such as the size of disk limiter 210, the shape of disk limiter 210, a specified mechanical shock force, and/or the clearance between disk 106 and disk limiter 210. In one embodiment, chamfer angle θ can vary between 1 and 30 degrees. For example, chamfer angle θ can be 5 degrees. In the embodiment of FIG. 3A, end portions 222 and 224 have the same chamfer angle θ, however, it is possible for end portions 222 and 224 to have different chamfer angles.

FIG. 3B shows contact between disk limiter 210 and disk 106 when disk 106 is in a deflected shape resulting from a non-operational mechanical shock. As shown in FIG. 3B, the chamfers of end portions 222 and 224 ordinarily provide a wider contact area between disk limiter 210 and top surface 107 during disk deflection. This wider contact area ordinarily reduces the concentration of forces on disk 106 at the location of disk limiter 210, thereby reducing the likelihood of permanent damage to disk 106.

FIG. 3C depicts a widthwise cross-sectional view of disk limiter 210. As shown in the embodiment of FIG. 3C, longitudinal edges 235 are rounded and are formed between the relatively flat bottom surface 226 of middle portion 220 and cover 200.

Figure 4A:
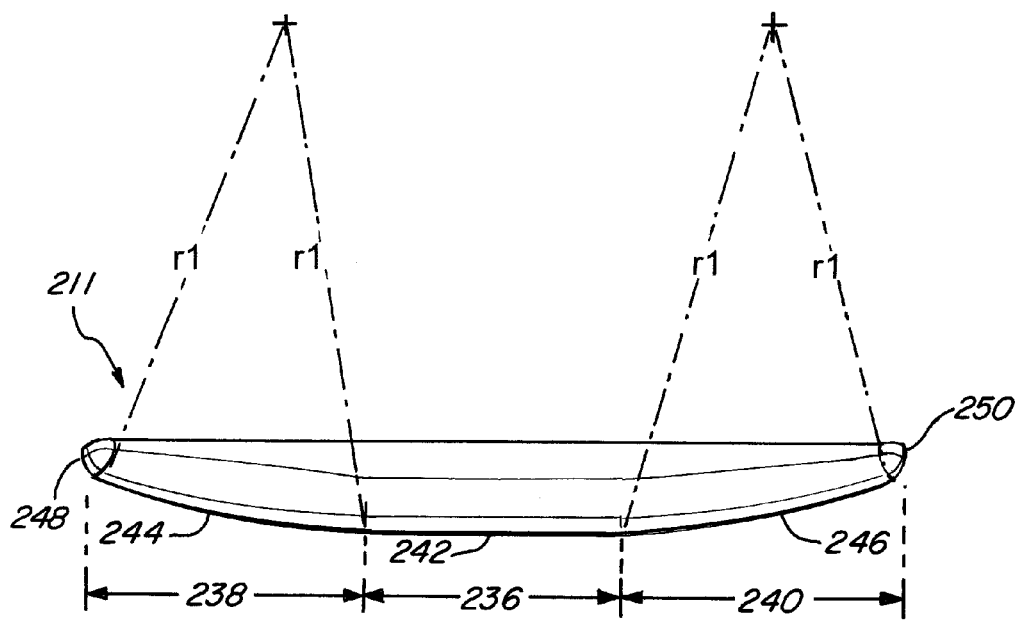
FIG. 4A depicts a three-dimensional view of a disk limiter according to a second embodiment.
Figure 4B:
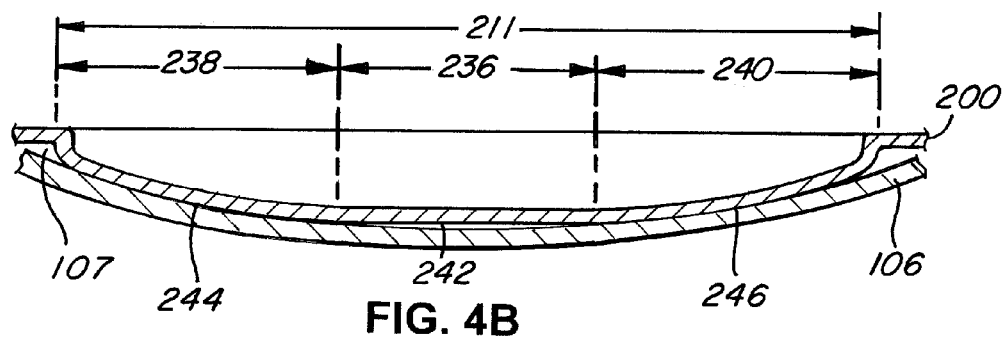
FIG. 4B depicts a lengthwise cross-sectional view of a disk limiter according to the second embodiment.
Figure 4C:
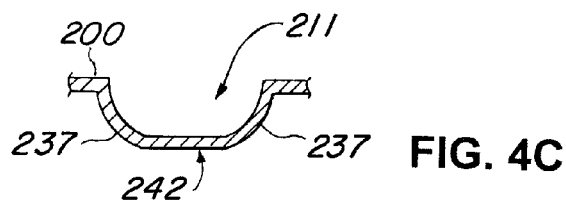
FIG. 4C depicts a widthwise cross-sectional view of a disk limiter according to the second embodiment.

FIGS. 4A to 4C depict a second embodiment of a disk limiter, which is positioned on cover 200. As with the disk limiter of the first embodiment, disk limiter 211 of FIGS. 4A to 4C can be, for example, formed in cover 200 by a metal stamping process, molded as part of cover 200, or formed of an elastomeric material or rubber that is bonded to the bottom surface of cover 200.

As shown in FIGS. 4A and 4B, disk limiter 211 includes middle portion 236 and end portions 238 and 240. Although middle portion 236 is shown in the embodiment of FIGS. 4A to 4C as being located approximately in the center of disk limiter 211, it will be appreciated by those of ordinary skill in the art that middle portion 236 can be offset from the center of disk limiter 211 without departing from the spirit and scope of the present invention.

As with the first embodiment, middle portion 236 has a relatively flat bottom surface 242 with respect to a widthwise cross-section of disk limiter 211, as shown in FIG. 4C. In addition, bottom surface 242 is substantially parallel to top surface 107 of disk 106. End portions 238 and 240 each have, respectively, relatively flat bottom surfaces 244 and 246 with respect to a widthwise cross-section of disk limiter 211. As with disk limiter 210 of FIGS. 3A to 3C, disk limiter 211 includes rounded ends 248 and 250 on end portions 238 and 240, respectively.

One way in which the second embodiment of FIGS. 4A to 4C differs from the first embodiment of FIGS. 3A to 3C is that bottom surfaces 244 and 246 each curve lengthwise from bottom surface 242 of middle portion 236 in a direction away from disk 106. As shown in FIG. 4A, bottom surfaces 244 and 246 each have a radius of curvature denoted in FIG. 4A as radius r1. Several factors may be considered when determining radius r1, such as the size of disk limiter 211, the shape of disk limiter 211, a specified mechanical shock force, and/or the clearance between disk 106 and disk limiter 211. In one embodiment, radius r1 can be greater than a total length of disk limiter 211. In other embodiments, radius r1 can be as small as one millimeter or as large as 130 millimeters. In the embodiment of FIG. 4A, end portions 238 and 240 have the same radius r1, however, it is possible for end portions 238 and 240 to have different radii for bottom surfaces 244 and 246.

FIG. 4B shows contact between disk limiter 211 and disk 106 when disk 106 is in a deflected shape resulting from a non-operational mechanical shock. As shown in FIG. 4B, curved bottom surfaces 244 and 246 ordinarily provide a wider contact area between disk limiter 211 and top surface 107 during disk deflection. This wider contact area ordinarily reduces the concentration of forces on disk 106 at a location of disk limiter 211, thereby reducing the likelihood of permanent damage to disk 106.

FIG. 4C depicts a widthwise cross-sectional view of disk limiter 211. As shown in the embodiment of FIG. 4C, longitudinal edges 237 are rounded and are formed between the relatively flat bottom surface 242 of middle portion 236 and cover 200.

Figure 5A:
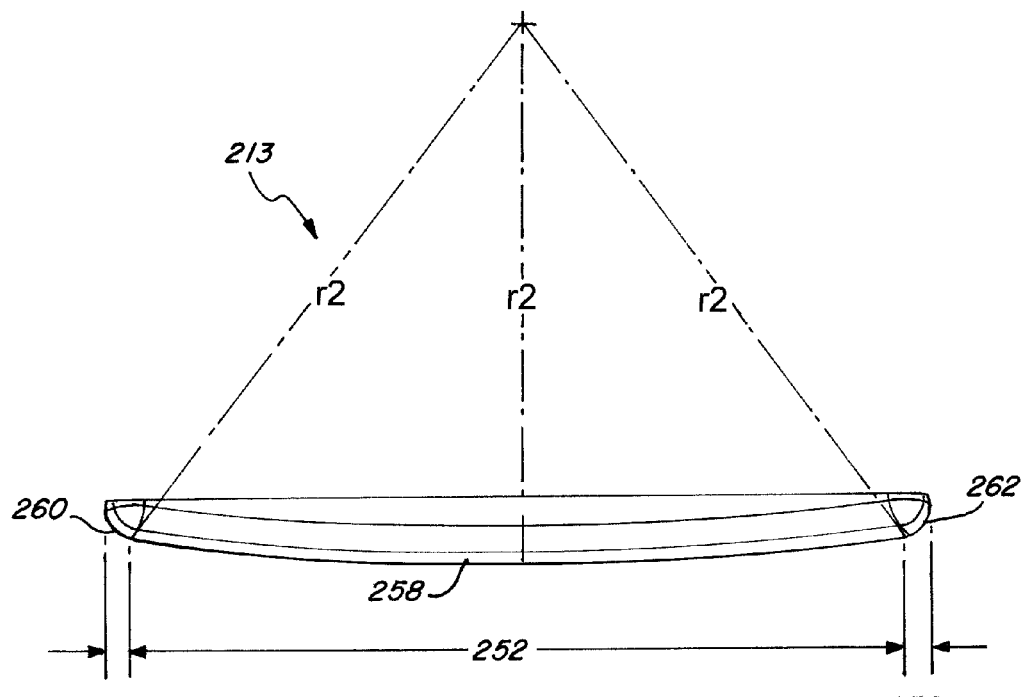
FIG. 5A depicts a three-dimensional view of a disk limiter according to a third embodiment.
Figure 5B:
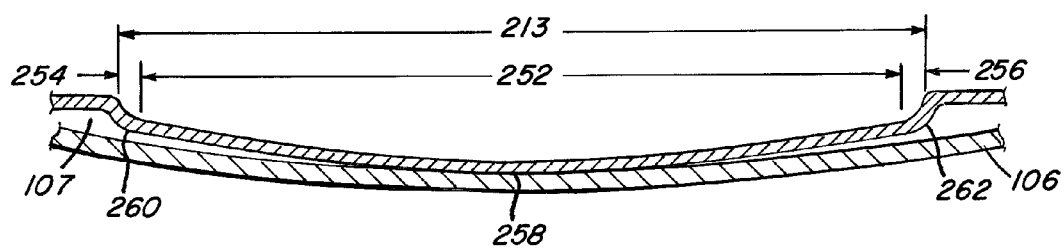
FIG. 5B depicts a lengthwise cross-sectional view of a disk limiter according to the third embodiment.
Figure 5C:
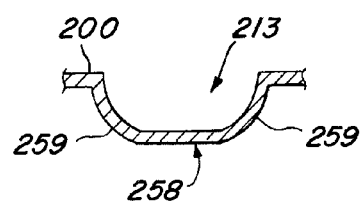
FIG. 5C depicts a widthwise cross-sectional view of a disk limiter according to the third embodiment.

FIGS. 5A to 5C depict a third embodiment of a disk limiter which is positioned on cover 200. As with the disk limiter of the first and second embodiments, disk limiter 213 of FIGS. 5A to 5C can be, for example, formed in cover 200 by a metal stamping process, molded as part of cover 200, or formed of an elastomeric material or rubber that is bonded to the bottom surface of cover 200.

As shown in FIGS. 5A and 5B, disk limiter 213 includes a longitudinally curved middle portion 252 between rounded end portions 254 and 256. Middle portion 252 has a relatively flat bottom surface 258 with respect to a widthwise cross-section of disk limiter 213, as shown in FIG. 5C. Similarly, end portions 254 and 256 each have, respectively, relatively flat bottom surfaces 260 and 262 with respect to a widthwise cross-section of disk limiter 213.

One way in which the embodiment of FIGS. 5A to 5C differs from the previous embodiments is that bottom surface 258 of middle portion 252 curves lengthwise in a direction away from disk 106. As shown in FIG. 5A, bottom surface 258 has a radius of curvature denoted in FIG. 5A as radius r2. Several factors may be considered when determining radius r2, such as the size of disk limiter 213, the shape of disk limiter 213, a specified mechanical shock force, and/or the clearance between disk 106 and disk limiter 213. In one embodiment, radius r2 can be greater than a total length of disk limiter 213. In alternative embodiments, bottom surface 258 can have different radii of curvature such that bottom surface 258 longitudinally defines a smooth curve of varying radii.

FIG. 5B shows contact between disk limiter 213 and disk 106 when disk 106 is in a deflected shape resulting from a non-operational mechanical shock. As shown in FIG. 5B, the center of bottom surface 258 is closest to disk 106. The curvature of bottom surface 258 ordinarily provides a wider contact area between disk limiter 213 and top surface 107 during disk deflection. This wider contact area ordinarily reduces the concentration of forces on disk 106 at a location of disk limiter 213, thereby reducing the likelihood of permanent damage to disk 106.

FIG. 5C depicts a widthwise cross-sectional view of disk limiter 213. As shown in the embodiment of FIG. 5C, longitudinal edges 259 are rounded and are formed between the relatively flat bottom surface 258 of middle portion 252 and cover 200.

Figure 6:
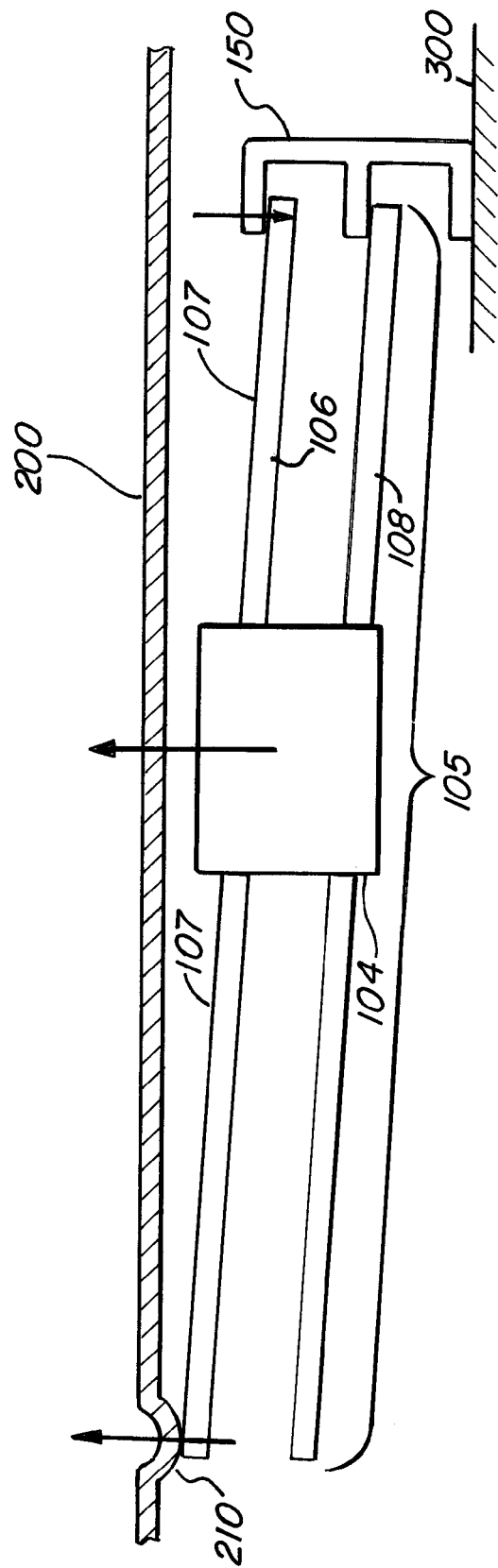
FIG. 6 illustrates an example of disk pack motion when a disk drive is subjected to non-operational mechanical shock.

FIG. 6 illustrates a cross-sectional view of disk drive 100 when it is subjected to a non-operational mechanical shock. Disk pack 105 includes spindle 104 and disks 106 and 108, which are mounted on spindle 104. In this example, when disk drive 100 is subjected to a non-operational mechanical shock, such as from being dropped, disk pack 105 moves with an upward force as indicated by the upward arrow pointing from spindle 104 toward cover 200. Often the top surfaces of disks 106 and 108 will first contact portions of ramp 150 which surround portions of the disks before contacting cover 200. As a result of this initial contact between the disks and ramp 150, disk pack 105 assumes the rocking shape illustrated in FIG. 6. In such a rocking shape, a portion of disk 106 which is approximately 180 degrees from ramp 150 impacts cover 200 with greater force than the impact between ramp 150 and disk 106. This relationship between forces is conceptually illustrated by the relative length of the arrows at opposite ends of disk 106. Accordingly, a disk limiter of the present invention, such as disk limiter 210, can be located approximately across a center portion of disk 106 from ramp 150 to help mitigate the greater impact caused by the rocking shape illustrated in FIG. 6.

Figure 7A:
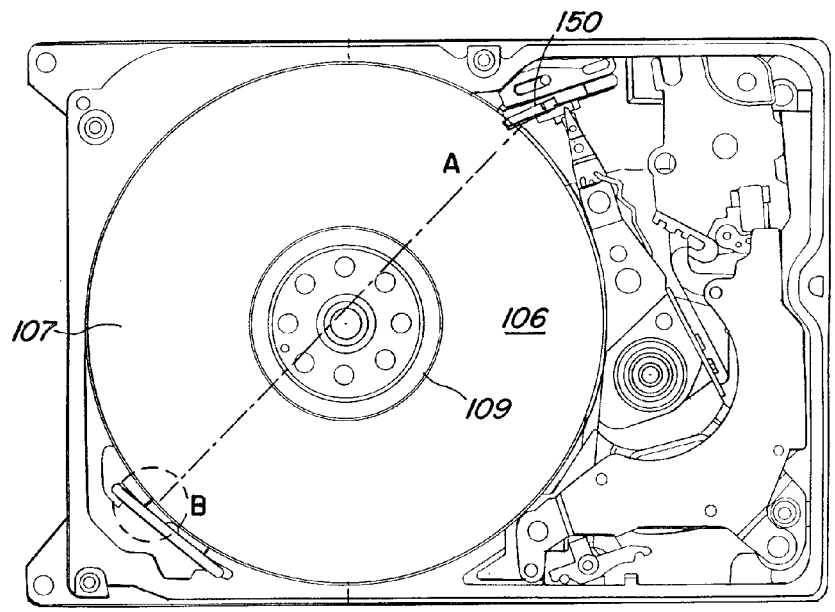
FIG. 7A depicts a top view of a disk drive indicating a location of a disk limiter according to an embodiment of the present invention.
Figure 7B:
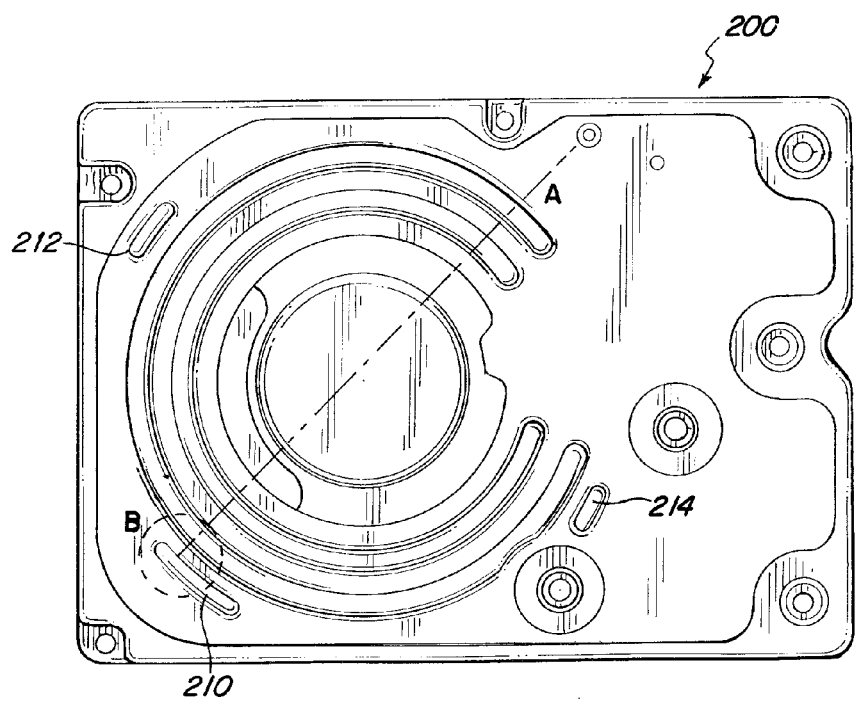
FIG. 7B depicts a bottom view of a disk drive cover indicating a location of a disk limiter corresponding to the location indicated in FIG. 7A.

FIGS. 7A and 7B illustrate the relative location of disk limiter 210 corresponding to its location in FIG. 6. FIG. 7A depicts a top view of disk drive 100 including a location of circle B, which is approximately across a center portion 109 of disk 106 from ramp 150 along line A. In this example embodiment, disk limiter 210 is positioned in the general vicinity of circle B.

FIG. 7B depicts a bottom view of cover 200 showing disk limiter 210 in the general vicinity of circle B along line A, which correspond to circle B and line A in FIG. 7A. Although a location for disk limiter 210 has been described in the embodiment of FIGS. 7A and 7B, those of ordinary skill in the art will appreciate that the disk limiters of the present invention are not limited to this location. For example, disk limiters of the present invention can be located so as to symmetrically contact a top surface of the disk during disk deflection, or can be located in the arrangement of disk limiters 210, 212 and 214, as shown in FIG. 2. As can be appreciated by those of ordinary skill in the art, many other arrangements of disk limiter locations are possible without departing from the spirit or scope of the present invention.

The foregoing description of the disclosed example embodiments is provided to enable any person of ordinary skill in the art to make or use the disclosed disk limiters. Various modifications to these examples will be readily apparent to those skilled in the art, and the principles defined herein may be applied to other examples without departing from the spirit or scope of the present invention. The described embodiments are to be considered in all respects only as illustrative and not restrictive and the scope of the invention is, therefore, indicated by the following claims rather than by the foregoing description. All changes which come within the meaning and range of equivalency of the claims are to be embraced within their scope.

What is claimed is:

1. A disk drive comprising:
a disk having a top surface;
a cover positioned over the disk; and
a disk limiter protruding from the cover toward the disk and configured to contact a portion of the top surface of the disk when the disk is deflected toward the cover,
wherein the disk limiter has a middle portion between two end portions, each end portion having a chamfer sloping from the middle portion in a direction away from the disk toward an end of the end portion such that the chamfer includes a contact area substantially along a length of the chamfer for contact with the top surface of the disk.

2. The disk drive of claim 1, wherein a bottom surface of each chamfer forms a chamfer angle with a plane substantially parallel to a bottom surface of the middle portion, and wherein the chamfer angle is within a range of one to thirty degrees.

3. The disk drive of claim 2, wherein the chamfer angle is approximately five degrees.

4. The disk drive of claim 1, further comprising a ramp which surrounds a portion of the disk, wherein the disk limiter is located approximately across a center portion of the disk from the ramp.

5. The disk drive of claim 1, wherein the disk limiter is formed in the cover of the disk drive.

6. The disk drive of claim 1, wherein the disk limiter is formed of elastomeric material bonded to the cover of the disk drive.

7. The disk drive of claim 1, wherein the end portions each have a rounded end on a side opposite the middle portion.

8. The disk drive of claim 1, wherein longitudinal edges on a bottom surface of the disk limiter are rounded.

9. The disk drive of claim 1, wherein the disk limiter is radially positioned and contoured about a center of the disk so as to contact an outer diameter portion of the top surface of the disk.

10. A disk drive comprising:
   a disk having a top surface;
   a cover positioned over the disk; and
   a disk limiter protruding from the cover toward the disk and configured to contact a portion of the top surface of the disk when the disk is deflected toward the cover,
   wherein the disk limiter has a middle portion between two end portions, each end portion having a curved bottom surface which curves from a bottom surface of the middle portion in a direction away from the disk toward an end of the end portion such that the curved bottom surface includes a contact area substantially along a length of the curved bottom surface for contact with the top surface of the disk.

11. The disk drive of claim 10, wherein a radius of the curved bottom surface of an end portion is greater than a total length of the disk limiter.

12. The disk drive of claim 10, wherein a radius of the curved bottom surface of an end portion is greater than or equal to one millimeter.

13. The disk drive of claim 10, wherein a radius of the curved bottom surface of an end portion is approximately 130 millimeters.

14. The disk drive of claim 10, further comprising a ramp which surrounds a portion of the disk, wherein the disk limiter is located approximately across a center portion of the disk from the ramp.

15. The disk drive of claim 10, wherein the disk limiter is formed in the cover of the disk drive.

16. The disk drive of claim 10, wherein the disk limiter is formed of elastomeric material bonded to the cover of the disk drive.

17. The disk drive of claim 10, wherein the end portions each have a rounded end on a side opposite the middle portion.

18. The disk drive of claim 10, wherein longitudinal edges of the curved bottom surfaces of the end portions are rounded.

19. The disk drive of claim 10, wherein the disk limiter is radially positioned and contoured about a center of the disk so as to contact an outer diameter portion of the top surface of the disk.

20. A disk drive comprising:
   a disk having a top surface;
   a cover positioned over the disk; and
   a disk limiter protruding from the cover toward the disk and configured to contact a portion of the top surface of the disk when the disk is deflected toward the cover,
   wherein the disk limiter has a middle portion between two end portions, the middle portion having a curved bottom surface which curves in a direction away from the disk toward the end portions such that the curved bottom surface includes a contact area substantially along a length of the curved bottom surface for contact with the top surface of the disk.

21. The disk drive of claim 20, further comprising a ramp which surrounds a portion of the disk, wherein the disk limiter is located approximately across a center portion of the disk from the ramp.

22. The disk drive of claim 20, wherein the disk limiter is formed in the cover of the disk drive.

23. The disk drive of claim 20, wherein the disk limiter is radially positioned and contoured about a center of the disk so as to contact an outer diameter portion of the top surface of the disk.

* * * * *